United States Patent [19]
Kohara et al.

[11] Patent Number: 4,871,704
[45] Date of Patent: Oct. 3, 1989

[54] CATALYST FOR OLEFIN POLYMERIZATION

[75] Inventors: Tadanao Kohara, Kanagawa; Satoshi Ueki, Saitama, both of Japan

[73] Assignee: Toa Nenryo Kogyo K.K., Tokyo, Japan

[21] Appl. No.: 255,085

[22] Filed: Oct. 7, 1988

[30] Foreign Application Priority Data

Oct. 8, 1987 [JP] Japan .................................. 62-252423

[51] Int. Cl.$^4$ ............................................. C08F 4/64
[52] U.S. Cl. .................................... 502/114; 502/108; 502/112; 502/113; 502/117; 502/118; 502/120; 502/129; 502/132; 502/133; 526/124; 526/152
[58] Field of Search ............... 502/108, 112, 113, 114, 502/117, 118, 120, 129, 132, 133

[56] References Cited

U.S. PATENT DOCUMENTS 3,242,099  3/1966  Manyik et al. .................. 502/114 X
3,299,024  1/1967  D'Alelio ......................... 502/114 X
3,679,775  7/1972  Hagemeyer et al. ........... 502/114 X

FOREIGN PATENT DOCUMENTS 1267221  5/1968  Fed. Rep. of Germany ...... 502/114

*Primary Examiner*—Patrick P. Garvin
*Attorney, Agent, or Firm*—M. B. Kurtzman

[57] ABSTRACT

A catalyst for olefin polymerization which comprises: (A) a catalyst component obtained by reacting (a) pentadiene or a derivative thereof with (b) an alkali metal and susequently reacting the reaction product with (c) a titanium compound or zirconium compound, and (B) aluminoxane.

7 Claims, No Drawings

CATALYST FOR OLEFIN POLYMERIZATION

BACKGROUND OF THE INVENTION

1. Field of Industrial Application

The present invention relates to a catalyst for olefin polymerization.

Since the synthesis of cis-1,3-pentadiene anion in 1979, complexes of this compound with a transition metal have been known. However, no instances have been reported in which its transition metal complex is employed as a catalyst component for olefin polymerization.

2. Summary of the Invention

It is an object of the present invention to provide a catalyst for olefin polymerization which is based on a pentadiene anion complex.

The present inventors found that a catalyst formed by the combination of an (open) pentadiene complex of zirconium and aluminoxane has an ability to polymerize olefins. This finding led to the present invention.

The gist of the present invention therefore resides in a catalyst for olefin polymerization which comprises:

(A) a catalyst component obtained by reacting (a) pentadiene or a derivative thereof with (b) an alkali metal and subsequently reacting the reaction product with (c) a Group 4b (Periodic Table—Handbook of Chemistry and Physics, 49th Edition, The Chemical Rubber Co., Cleveland, Ohio) metal compound, preferably a titanium compound or zirconium compound, and (B) an aluminoxane.

DETAILED DESCRIPTION OF THE INVENTION

1. Raw materials for catalyst component (a) Pentadiene or a derivative thereof The pentadiene or a derivative thereof (referred to as component (a) hereinafter) is represented by the formula below.

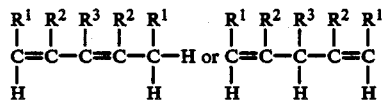

(where $R^1$ denotes a hydrogen atom, hydrocarbyl group having 1 to 8 carbon atoms, or $-Si(OR^4)_3$ group; $R^2$ and $R^3$ which can be the same or different each denote a hydrogen atom or a hydrocarbyl group having 1 to 8 carbon atoms; $R^4$ denotes a hydrocarbyl group having 1 to 5 carbon atoms.)

Examples of component (a) represented by the formula above include 1,3-pentadiene, 1,4-pentadiene, 3-methyl-1,3-pentadiene, 3-methyl-1,4-pentadiene, 2,4-dimethyl-1,3-pentadiene, 2,4-dimethyl-1,4-pentadiene, 3-ethyl-1,3-pentadiene, 1,5-bistrimethoxysilyl-1,3-pentadiene, and 1,5-bistrimethoxysilyl-1,4-pentadiene. Particularly preferable among them is 1,3-pentadiene.

(b) Alkali metal

The alkali metal (referred to as component (b) hereinafter) includes lithium, sodium, potassium, rubidium, and cesium. Potassium is most desirable among them.

(c) Titanium compound or zirconium compound

The titanium compound or zirconium compound (referred to as component (c) hereinafter) includes titanium tetrahalide or zirconium tetrahalide represented by the formulas below.

$TiCl_4$, $TiBr_4$, $TiI_4$, $ZrCl_4$, $ZrBr_4$, and $ZrI_4$.

$TiCl_4$ and $ZrCl_4$ are particularly preferable among them.

2. Preparation of catalyst component

The catalyst component pertaining to the present invention is obtained by reacting component (a) with component (b), and then reacting the reaction product with component (c).

(A) Reaction of component (a) with component (b)

The reaction of component (a) with component (b) is usually accomplished in a solvent such as tetrahydrofuran, diethyl ether, and dioxane. The molar ratio of component (a) to component (b) is 1 to 10. The solvent should preferably contain an amine such as trimethylamine, triethylamine, tributylamine, trimethanolamine, triethanolamine, and triisopropanolamine.

The reaction is usually carried out at $-50°$ C. to $+100°$ C. for 0.5 to 20 hours.

The above-mentioned reaction gives pentadienyl anion. Its cis/trans ratio can be controlled by changing component (b) and solvent to be used. In the case where component (b) is potassium and the solvent is tetrahydrofuran, the cis content can be 98% or above. The ligand which is formed in this reaction presumably has a structure of

(open pentadiene complex).

(B) Reaction with component (c)

The reaction product obtained in step (1) above is subsequently reacted with component (c). This reaction is usually carried out in a solvent which may be used in step (A) above. The reaction is performed at $-100°$ C. to $+50°$ C. for 5 to 50 hours. The reaction temperature may be gradually raised as the reaction proceeds.

The amount of component (c) should be 0.1 to 2 mol for 1 mol of component (a) in the reaction product.

The catalyst component pertaining to the present invention can be prepared as mentioned above. The catalyst component may be brought into contact with a metal oxide.

The metal oxide that can be used for this purpose is an oxide of an element selected from Groups II to IV of the periodic table. Examples of the metal oxide include $B_2O_3$, $MgO$, $Al_2O_3$, $SiO_2$, $CaO$, $TiO_2$, $ZnO$, $ZrO_2$, $SnO_2$, $BaO$, and $ThO_2$. Preferable among them are $B_2O_3$, $MgO$, $Al_2O_3$, $SiO_2$, $TiO_2$, and $ZrO_2$. Particularly desirable are $Al_2O_3$ and $SiO_2$. These metal oxides can also be used in the form of compound oxide such as $SiO_2\text{-}MgO$, $SiO_2\text{-}Al_2O_3$, $SiO_2\text{-}TiO_2$, $SiO_2\text{-}V_2O_5$, $SiO_2\text{-}Cr_2O_3$, and $SiO_2\text{-}TiO_2\text{-}MgO$.

The above-mentioned metal oxides and compound oxides should preferably be in the form of anhydride in principle; but they may contain a trace amount of hydroxide which is present under normal conditions.

The metal oxide should be calcined at as high a temperature as possible prior to use in order to remove poisonous substances, and, after calcination, it should be kept away from air.

The contacting of said catalyst component with a metal oxide is usually achieved in an inert hydrocarbon such as hexane, heptane, cyclohexane, benzene, toluene, and xylene at a temperature in the range of room temperature to the boiling point of the hydrocarbon for 0.5 to 20 hours. The amount of the metal oxide is 1 to 500 parts by weight for 1 part by weight of said catalyst component.

Cocatalyst

Aluminoxane

Aluminoxane is a compound represented by the formula below.

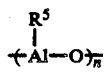

(where $R^5$ denotes a hydrocarbyl group having 1 to 8 carbon atoms and n is a positive integer of from 4 to about 26 and preferably 14–20.) It is usually produced by reacting an organoaluminum compound of the formula $AlR_3^5$ with water.

Examples of the organoaluminum compound include trimethyl aluminum, triethyl aluminum, triisobutyl aluminum, trihexyl aluminum, trioctyl aluminum, and triphenyl aluminum. Trimethyl aluminum is particularly preferable.

The organoaluminum compound can be reacted with not only ordinary water but also water of crystallization in iron sulfate or copper sulfate.

The catalyst of the present invention is composed of the catalyst component and aluminoxane prepared as mentioned above. The ratio of the two components is such that the amount of aluminoxane is 1 to $10^6$ gram-atom (in terms of aluminum) for 1 gram-atom of titanium or zirconium in the catalyst component.

Polymerization of olefins

The catalyst of the present invention can be used for the homopolymerization of α-olefin such as ethylene, propylene, 1-butene, 1-hexene, 4-methyl-1-pentene, and 1-octene and also for the copolymerization of said α-olefin with other olefins.

The polymerization reaction may be accomplished in either gas phase or liquid phase. The liquid phase polymerization may be accomplished in an inert hydrocarbon such as n-butane, isobutane, n-pentane, isopentane, hexane, heptane, octane, cyclohexane, benzene, toluene, and xylene, or in a liquid monomer. The polymerization temperature is usually in the range of $-80°$ C. to $+150°$ C., preferably 40° to 120° C. The polymerization pressure is, for example, 1 to 60 atm. The molecular weight of the polymer can be properly regulated by the aid of hydrogen or any other known molecular weight modifier added to the polymerization system. In the copolymerization, a major olefin is copolymerized with other minor olefin in an amount up to 30 wt%, preferably from 0.3 to 15 wt%, of the major olefin. The calalyst of the present invention is used for polymerization reaction which is carried out continuously or batchwise under normal conditions. The copolymerization may be carried out in a single step or in two or more steps.

Effect of the invention

The catalyst of the present invention is based on a pentadiene anion complex, and it enables the polymerization of olefins.

EXAMPLE 1

Preparation of catalyst component

In a reaction vessel, with the atmosphere therein replaced with nitrogen gas, was placed a mixture of 16.5 ml of tetrahydrofuran (THF) and 8.5 ml of triethylamine and then 1.57 g of metallic potassium. To the reactants was added dropwise 9 ml of 1,3-pentadiene at 0° C. The reactants were heated up to room temperature over 2 hours. To the reactants was added additional 10 ml of THF. The reactants were heated to 40° C. until the reaction was completed. The reaction solution was cooled to 0° C. to cause orange crystals to separate out. The crystals were filtered off and dried. The yield was 67 mol%. The reaction formula is as follows:

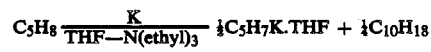

The thus obtained crystals were dissolved in THF, and the solution was added dropwise at $-70°$ C. to a THF slurry containing 1.86 g of $ZrCl_4$. The resulting slurry was slowly heated to room temperature over 24 hours. Solids were filtered off and the filtrate was freed of THF by distillation to cause solids to separate out. The solids which had separated out were dissolved in toluene containing 5 wt% of THF. Insoluble matters were filtered off and the filtrate was freed of solvent by distillation. Upon drying the precipitates, there was obtained 0.4 g of dark brown crystals (catalyst component).

Polymerization of ethylene

In a 1-liter glass autoclave, with the atmosphere therein replaced with nitrogen gas, were placed 50 mg of the catalyst component obtained as mentioned above, aluminoxane (10 miligram-atom as aluminum), and 250 ml of toluene. (The aluminoxane is one which was synthesized from trimethyl aluminum and $CuSO_4.5H_2O$.) Into the autoclave was introduced ethylene gas. The polymerization of ethylene was performed at 50° C. for 1 hour. The catalytic activity was 143 g/g-Zr.atm.hour. The resulting polyethylene was found to have a viscosity-average molecular weight of $1.5 \times 10^6$.

EXAMPLE 2

A toluene solution containing 0.15 g of the catalyst component prepared in Example 1 was added to a toluene slurry containing 3 g of alumina which had previously been calcined at 500° C. for 6 hours. The reaction was performed at 70° C. for 2 hours. The resulting solids were thoroughly washed with toluene and n-hexane and dried. The dried solids were found to contain 5.6 mg of zirconium per gram.

The polymerization of ethylene was performed in the same manner as in Example 1, except that the catalyst component was replaced by the solids obtained in the above-mentioned step. The catalytic activity was 290 g/g.Zr.atm.hour.

We claim:

1. A catalyst comprising (i) a catalyst component obtained by reacting (i) a pentadiene with (b) an alkali metal and contacting the product therefrom with (c) a Group 4b metal compound, and (ii) an aluminoxane.

2. The catalyst in accordance with claim 1 wherein the pentadiene is represented by the formula:

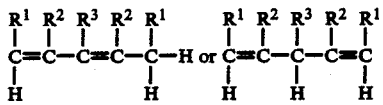

wherein $R^1$ represents hydrogen, a hydrocarbyl group having from 1 to 8 carbon atoms, or a $-Si(OR^4)_3$ group, $R^2$ and $R^3$, which can be the same or different, each represents a hydrogen or hydrocarbyl group having one 1 to 8 carbon atoms and $R^4$ represents a hydrocarbyl group having 1 to 5 carbon atoms.

3. The catalyst in accordance with claim 2 wherein the Group 4b metal is selected from zirconium and titanium.

4. The catalyst in accordance with claim 2 wherein the Group 4b metal compound is a titanium halide or a zirconium halide.

5. The catalyst in accordance with claim 3 wherein the Group 4b metal compound is a titanium halide or a zirconium halide.

6. The catalyst in accordance with claim 2 further characterized in being supported on a metal oxide.

7. The catalyst in accordance with claim 5 wherein the catalyst component is supported on the metal oxide.

* * * * *